United States Patent [19]

Zushi et al.

[11] Patent Number: 5,427,406
[45] Date of Patent: Jun. 27, 1995

[54] AIR BAG DEVICE WITH AN INFLATION MOUNTING STRUCTURE

[75] Inventors: Takayasu Zushi; Motonobu Kitagawa; Kazuhiko Yamakawa; Masato Kuretake; Yoshimi Yoshida; Sawayo Uda, all of Shiga, Japan

[73] Assignee: Takata Corporation, Tokyo, Japan

[21] Appl. No.: 140,974

[22] Filed: Oct. 20, 1993

[30] Foreign Application Priority Data

Oct. 30, 1992 [JP] Japan .................................. 4-292919

[51] Int. Cl.⁶ ............................................. B60R 21/16
[52] U.S. Cl. .................. 280/728.2; 280/741; 403/349
[58] Field of Search ............... 280/728 A, 730 R, 731, 280/732, 736, 741; 403/349

[56] References Cited

U.S. PATENT DOCUMENTS

| 2,444,758 | 7/1948 | Stillbach | 403/349 |
| 4,830,401 | 5/1989 | Honda | 280/736 |
| 4,943,086 | 7/1990 | Cunningham | 280/741 |
| 5,277,442 | 1/1994 | Cuevas | 280/731 |

FOREIGN PATENT DOCUMENTS 62-77281  4/1987  Japan .................................. 74/552

*Primary Examiner*—Karin L. Tyson
*Attorney, Agent, or Firm*—Kanesaka & Takeuchi

[57] ABSTRACT

A bag holding member in an air bag device for protecting the occupant of a vehicle has an opening in which a bag inflator is fitted. The inflator has a flange held against the bag holding member around its opening. One of the bag holding member and the flange has a plurality of pins projecting toward the other, and the other has a plurality of slits lying circumferentially of the opening of the bag holding member. Each of the pins is engaged in one of the slits to secure the inflator to the bag holding member.

6 Claims, 7 Drawing Sheets

AIR BAG DEVICE WITH AN INFLATION MOUNTING STRUCTURE

FIELD OF THE INVENTION

The present invention relates to a mounting structure of an inflator in an air bag device which extends upon collision of a vehicle to protect its occupant.

DESCRIPTION OF THE RELATED ART

The air bag device which is installed in front of a seat in an automobile, as on a steering device, or instrument panel, is intended for protecting its occupant in cases of emergency, such as the collision of the vehicle, by causing an air bag to extend rapidly by the pressure of gas released from a gas generator called an inflator.

FIG. 7 is a sectional view showing by way of an example of a conventional air bag device for a driver of a vehicle, FIG. 8 is an enlarged view of part A of FIG. 7, and FIG. 9 is an exploded perspective view showing mounting structure of an inflator.

A member 10 for holding an air bag is called a retainer, and has a central opening (inflator mounting hole) 12 in which the inflator 14 is fitted. The air bag 16 has an opening 18 through which the inflator 14 partly projects into the air bag 16, and the opening 18 is lying along the edge portion of the mounting hole 12.

The edge portion of the air bag 16 surrounding its opening 18 is held by a holding ring 20 against the edge portion of the mounting hole 12. FIG. 9 also shows a reinforcing fabric 17.

The air bag 16 is normally in an extensibly folded form, and is enclosed in a modular cover 22. The modular cover 22 is torn by the inflating pressure of the air bag 16 when the air bag 16 is extended by the gas released from the inflator 14.

Stud bolts 38 are secured to the holding ring 20, extend through bolt holes 40 in the air bag 16, bolt holes 42 in the retainer 10 and bolt holes 44 in a flange portion of the inflator 14, and are tightened by nuts 46 to fasten the air bag 16 and the inflator 14 to the retainer 10, as shown in FIG. 9.

As described above, the bolts of the holding ring 20 are passed through the bolt holes 40, 42 and 44, and then they are tightened with the nuts 46 to mount the inflator 14 in the conventional air bag device. Such working consumes a great deal of time and labor.

OBJECT AND SUMMARY OF THE INVENTION

It is an object of this invention to provide an inflator mounting structure which can greatly facilitate the mounting of an inflator in an air bag device.

This object is attained by a structure for mounting an inflator to a bag holding member in an air bag device, the mounting structure comprising:

an opening provided at the bag holding member in which the inflator is fitted;

the inflator having a flange held against the bag holding member around its opening;

a plurality of pins projecting from one of the bag holding member and the flange; and a plurality of slits formed in the other of the bag holding member and the flange and lying circumferentially of the opening of the bag holding member, each of the pins being engaged in each of the slits to secure the inflator to the bag holding member.

When the inflator is mounted to the bag holding member, the pins are inserted in the slits, while the flange of the inflator is brought into contact with the bag holding member, and the inflator is rotated to bring the pins into engagement with the slits to secure the inflator to the bag holding member.

DESCRIPTION OF THE PREFERRED EMBODIMENTS

Figure 1:
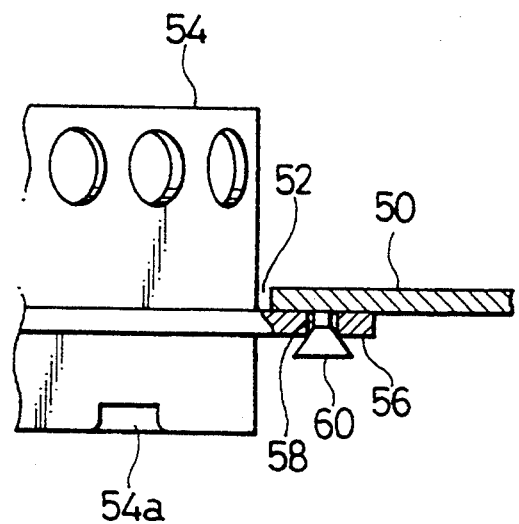
FIG. 1 is a sectional view, showing a structure according to a preferred embodiment of the present invention.
Figure 2:
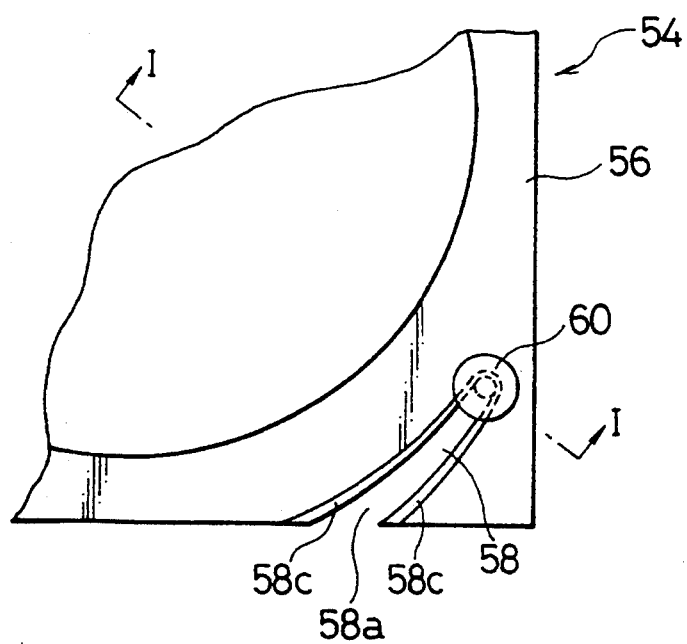
FIG. 2 is a top plan view showing a structure according to a preferred embodiment.
Figure 3:
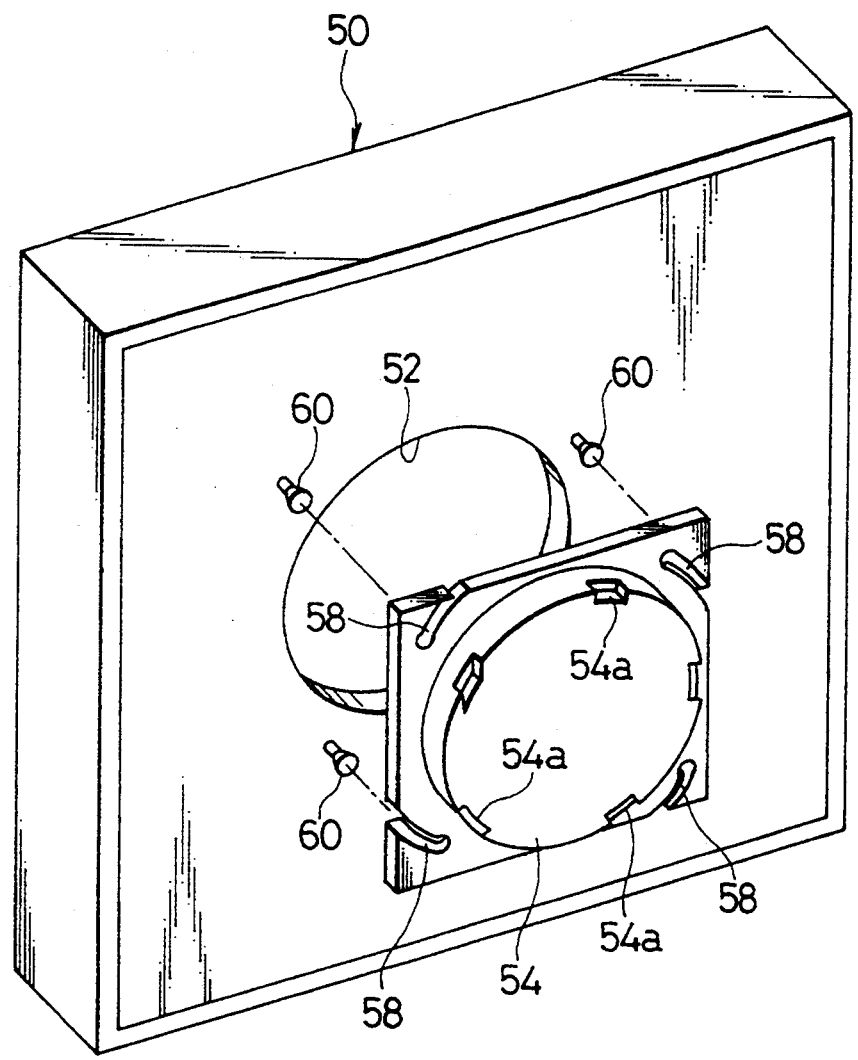
FIG. 3 is an exploded perspective view showing a structure according to a preferred embodiment.
Figure 4:
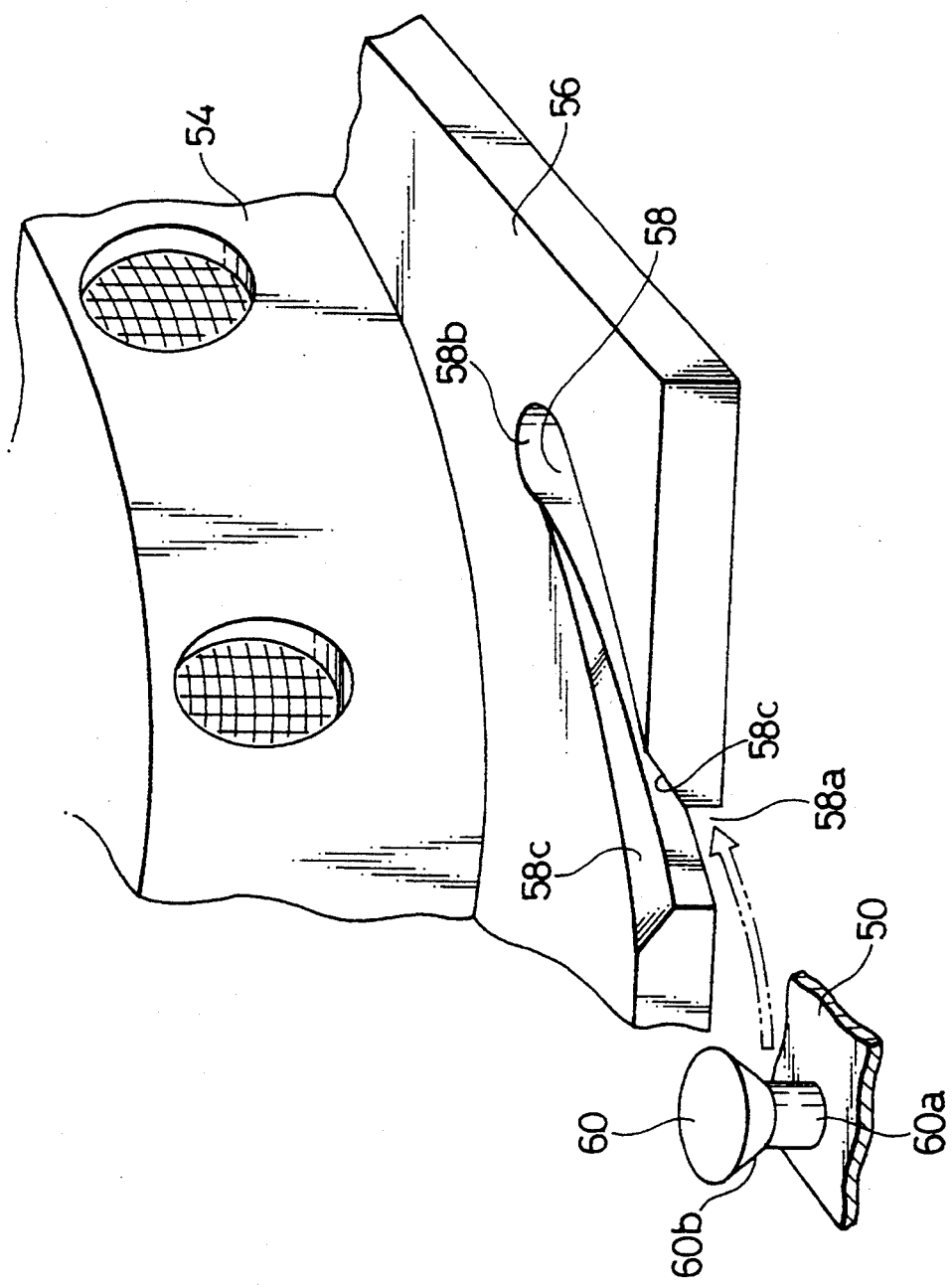
FIG. 4 is another exploded perspective view showing a structure according to a preferred embodiment.

An embodiment will be described with reference to FIGS. 1 to 4 which relates to an inflator mounting structure to a retainer in the air bag device for a driver.

A retainer 50 has a central opening (inflator mounting hole) 52 in which an inflator 54 is fitted. The inflator 54 has a flange 56 held against the back side of the edge portion of the retainer 50 around its opening 52. The flange 56 has arcuate slits 58 which are equally spaced apart from the center of the inflator 54. The retainer 50 has pins 60 projecting from its back surface. The pins 60 are engageable with the slits 58, respectively, whereby the inflator 54 is secured to the retainer 50.

Each slit 58 has an inlet portion 58a which is greater in width than an end portion 58b, so that the pin 60 may be easily inserted in the slit 58. Each pin 60 consists of a shank 60a, and a tapered portion 60b having a peripheral surface tapering fatter toward a top thereof.

Beveled surfaces 58c are formed along both sides of each arcuate slit 58 to fit to the tapered portion 60b. Each beveled surface 58c has a width which gradually becomes smaller from the inlet portion 58a to the end portion 58b, so that as the pin 60 is moved toward the closed end 58b of the slit 58, the tapered surface of the tapered portion 60b engages the beveled surfaces 58c more tightly.

When the pin 60 has been moved into the end portion 58b of the slit 58, the tapered surface of its head 60b engages the edge of the end portion 58b tightly to whereby fixing the flange 56 tightly against the retainer 50. Thus, the inflator 54 is attached to the retainer 50 firmly so as not to move at all relative to the retainer 50.

The inflator 54 is provided around the peripheral surface of its rear end with a plurality of appropriately spaced apart tool engaging grooves 54a which facilitate the rotation of the inflator 54 when it is attached.

Figure 5:
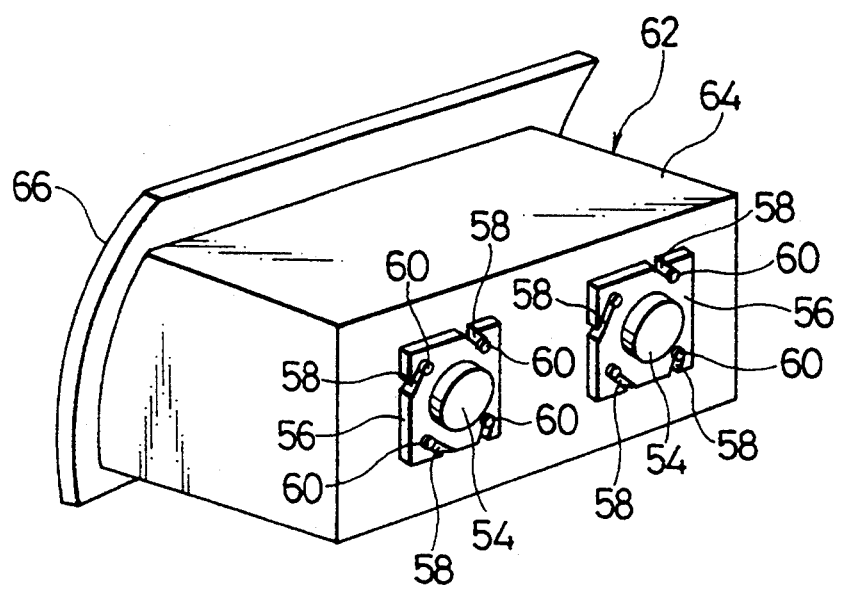
FIG. 5 is a perspective view showing an air bag device for a passenger's seat having a structure according to a preferred embodiment.

Although the structure being described above shows the inflator mounting structure to the retainer for the air bag device for the driver, it is also applicable to an air bag device 62 for a passenger, as shown in FIG. 5. The air bag is contained in a folded form in a container 64. The container 64 has inflators 54 on its back. The inflator mounting structure shown in FIG. 5 is exactly as same as in FIGS. 1 to 4, and the pins 60 which project from the container 64 are engaged with the arcuate slits 58 in the flanges 56 of the inflator 54. The container 64 has a lid 66 at its front end, and if the inflators 54 are inflated the air bag extends and it forces the lid 66 to rotate to open as a door, and the air bag extends into the cabin.

Figure 6:
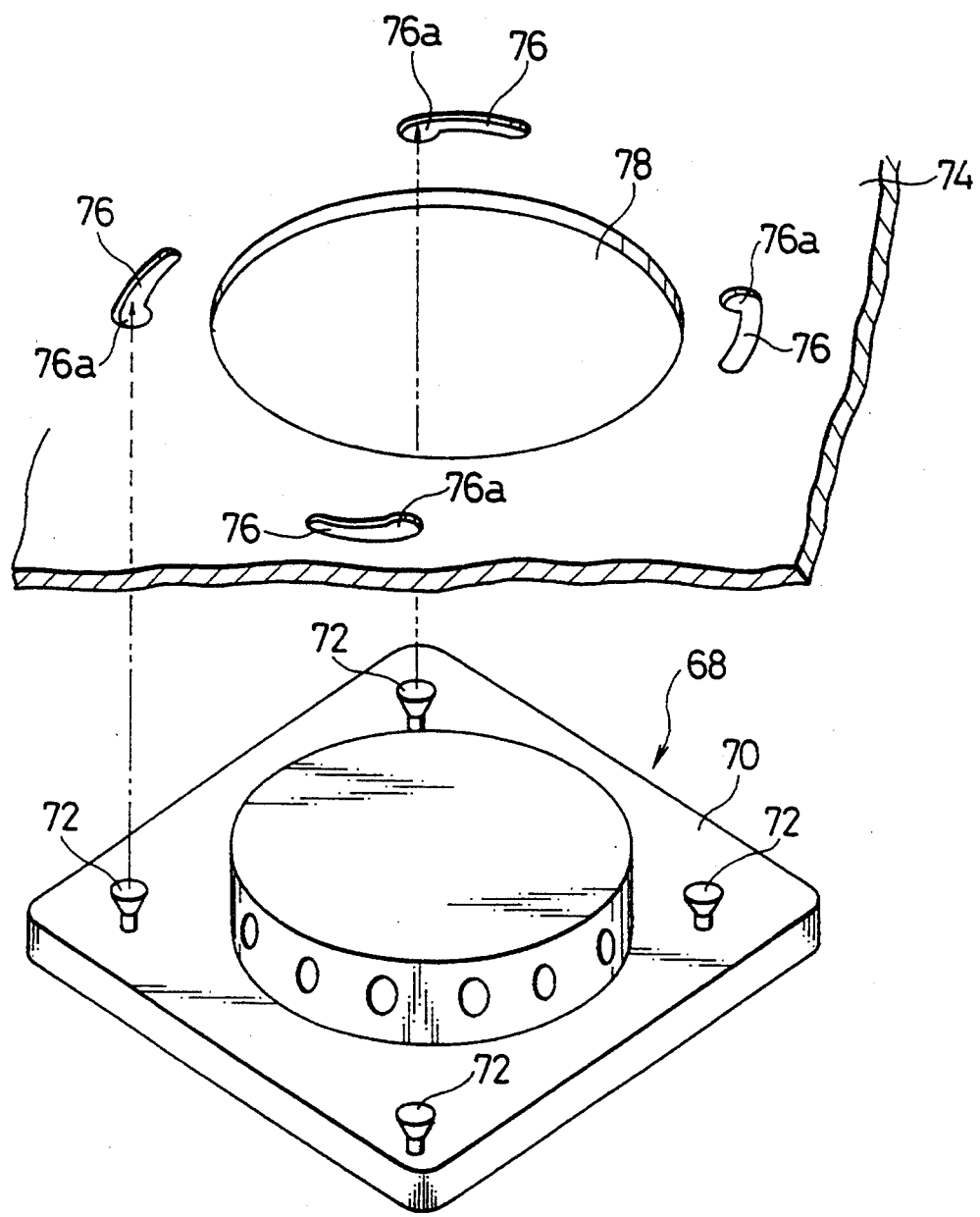
FIG. 6 is an exploded perspective view showing a structure according to another embodiment.
Figure 7:
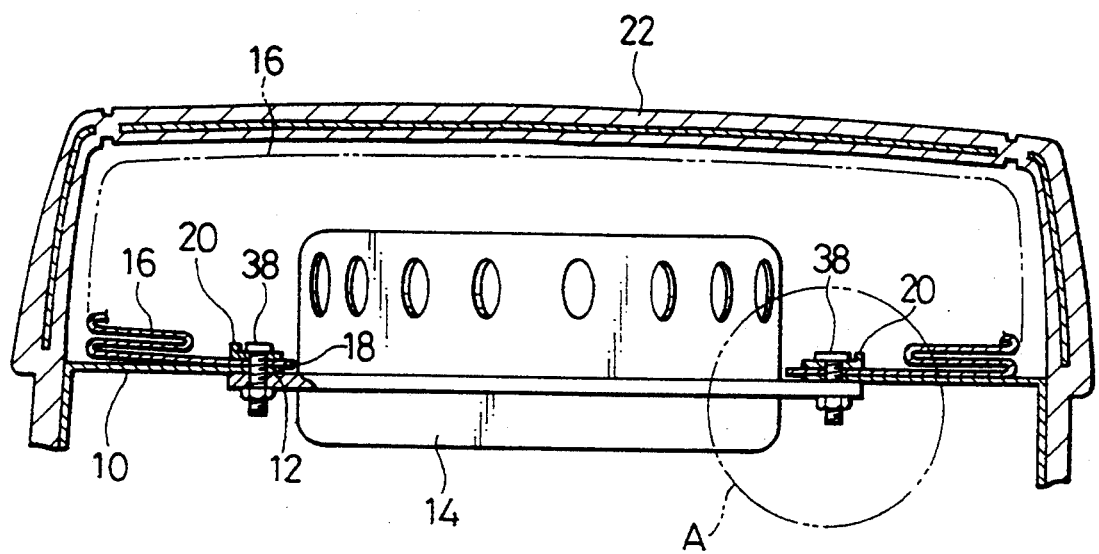
FIG. 7 is a sectional view showing an air bag device of the prior art.
Figure 8:
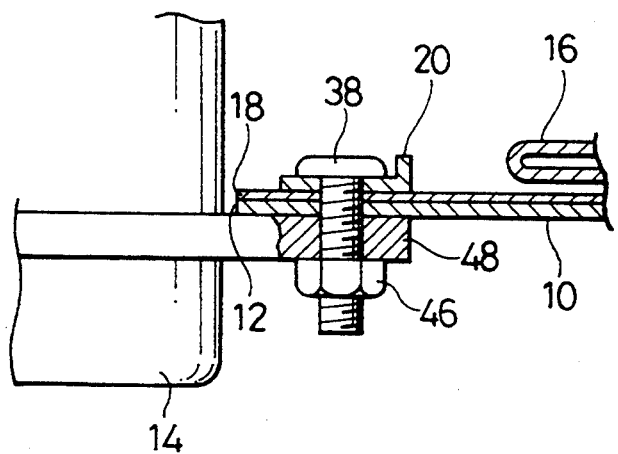
FIG. 8 is a sectional view showing a mounting structure of the prior art.
Figure 9:
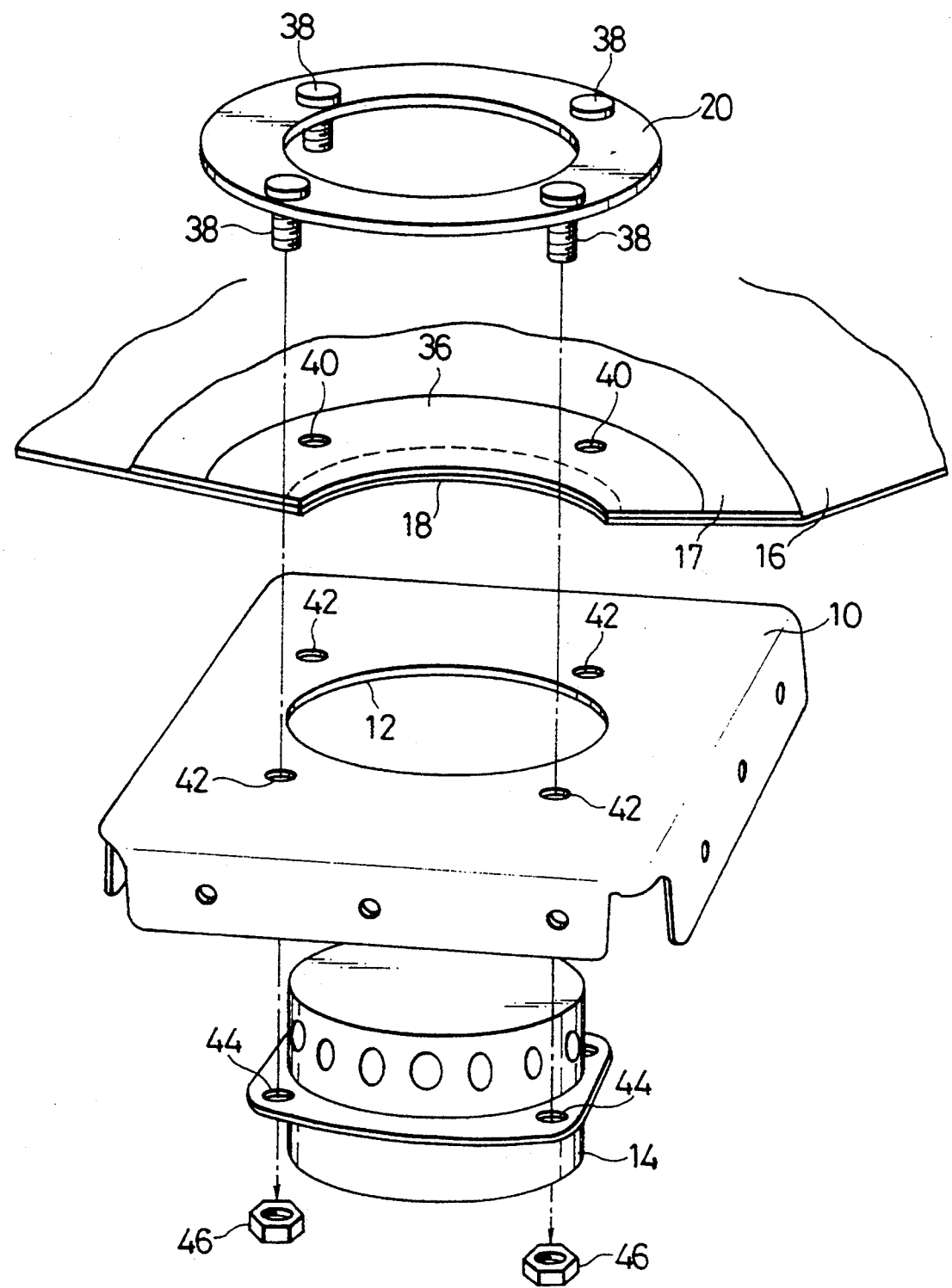
FIG. 9 is an exploded perspective view showing an inflator mounting structure according to the prior art.

While the pins 60 project from the retainer 50, or container 64, an alternative arrangement is shown in FIG. 6, wherein an inflator 68 has pins 72 projecting from its flange 70, and arcuate slits 76 may be provided on the retainer or the container 74. Numeral 78 denotes an opening in which the inflator 68 is fitted. Arcuate slits 76 are equally spaced apart from the center of the opening 78. The pins 72 are of the same shape with the pins 60, and each slit 76 has an enlarged portion 76a to admit the enlarged head of the corresponding pin 72. When the pins 72 are inserted into the enlarged portions 76a and the inflator 68 is rotated, the pins 72 is fixed at end portions of the slits 76 and the inflator 68 is mounted firmly against the retainer, or container 74.

According to the present invention, it is also possible to provide a gas seal between the flange of the inflator and the bag retainer, or container.

The structure of this invention can greatly facilitate and accelerate the work of mounting the inflator to the bag retainer, or container, as it is sufficient to align the inflator with the retainer, or container, and rotate the inflator.

What is claimed is:

1. An air bag device for a vehicle, comprising,
    an air bag holding member for holding an air bag thereon and having an opening,
    an inflator situated in the opening and having a flange formed on an outer periphery of the inflator, said flange being held against the air bag holding member around the opening,
    a plurality of pins projecting from one of said air bag holding member and said flange, each pin being formed of a shank and an enlarged head at one end of the shank, said enlarged head having a tapered surface extending from a periphery edge of the head to the shank,
    a plurality of curved slits provided in the other of said air bag holding member and said flange, and laying circumferentially of said opening, each slit having an inlet portion and an end portion, said inlet portion having a width greater than that of the end portion and gradually decreasing from the inlet portion to the end portion, and
    beveled surfaces for defining each of the curved slits and being formed along the slit at a side abutting against the head of the pin, each beveled surface having a width gradually decreasing from the inlet portion to the end portion and a thickness gradually increasing from the inlet portion to the end portion so that when the inflator is engaged with the air bag holding member, the pins can easily enter into the slits and while the inflator is rotated, the pins securely engage the slits.

2. An air bag device as set forth in claim 1, wherein said air bag device is for a driver, and said bag holding member is a retainer.

3. An air bag device as set forth in claim 1, wherein said air bag device is provided for a passenger, and said bag holding member is a container.

4. An air bag device as set forth in claim 1, wherein said inflator has a plurality of grooves in which a tool is engageable to rotate said inflator.

5. An air bag device as set force in claim 1, wherein said end portion does not have the beveled surface therearound.

6. An air bag device as set forth in claim 1, wherein each curved slit includes an enlarged portion at the inlet portion so that the curved slit constitutes a hole, said enlarged head of the pin passing through the enlarged portion and engaging the slit.

* * * * *